(No Model.) 2 Sheets—Sheet 1.
P. SPENCE.
FURNACE FOR ROASTING COPPER AND OTHER ORES.
No. 248,521. Patented Oct. 18, 1881.
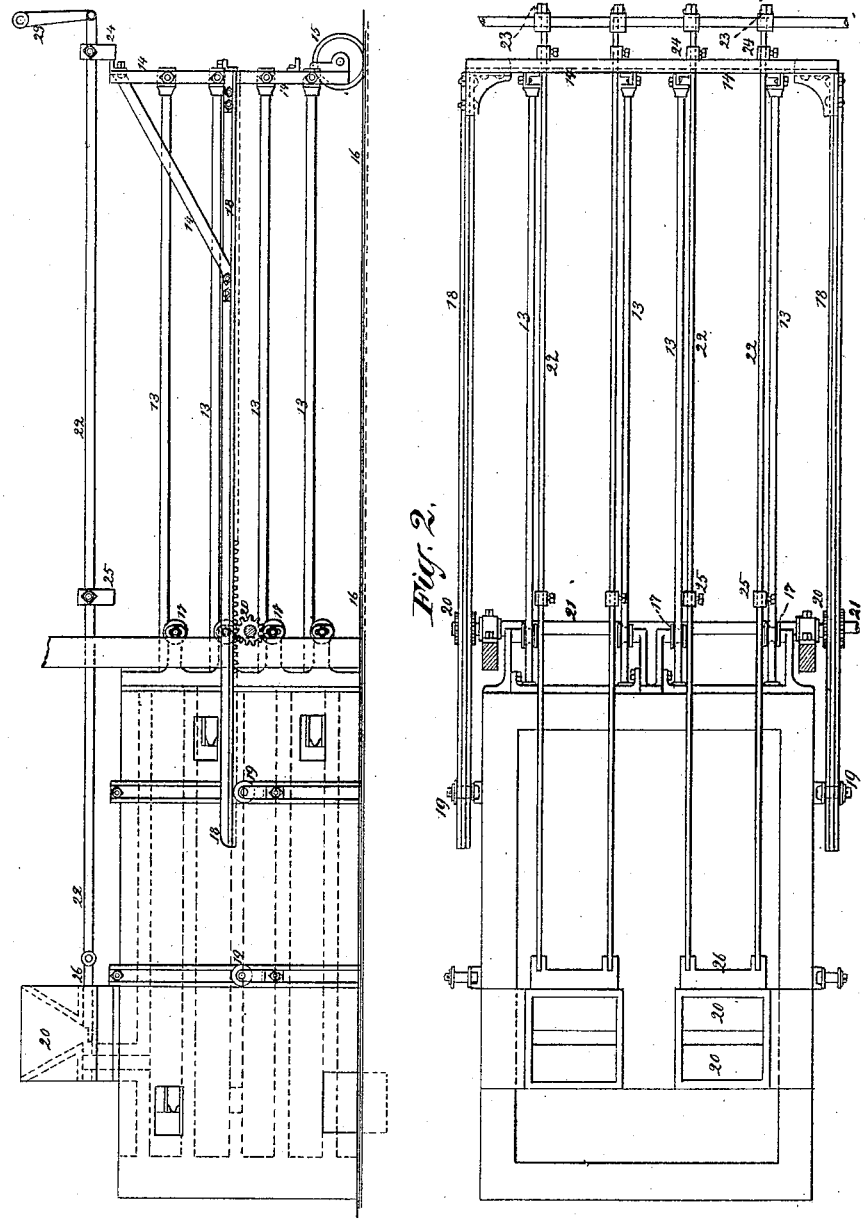
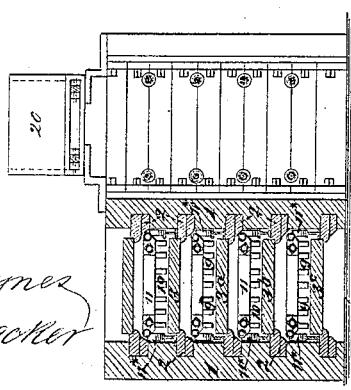
Witnesses
Fred Haynes
John Becker
Inventor
Peter Spence
by his Attorneys
Brown & Brown
N. PETERS. Photo-Lithographer. Washington, D. C.

(No Model.) 2 Sheets—Sheet 2.
P. SPENCE.
FURNACE FOR ROASTING COPPER AND OTHER ORES.
No. 248,521. Patented Oct. 18, 1881.
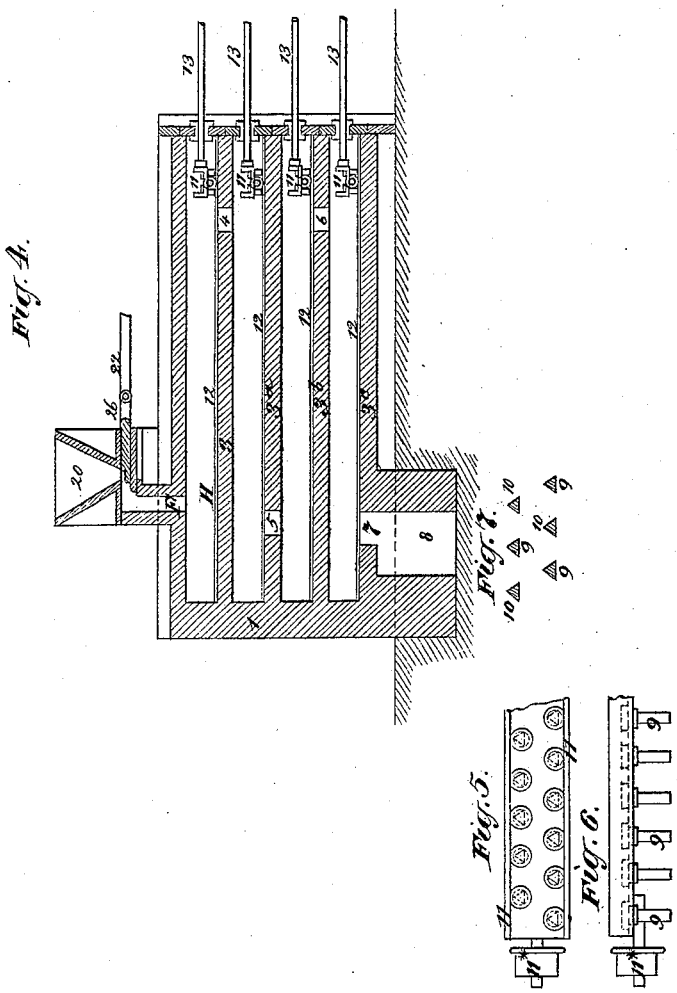

United States Patent Office.

PETER SPENCE, OF MANCHESTER, COUNTY OF LANCASTER, ENGLAND.

FURNACE FOR ROASTING COPPER AND OTHER ORES.

SPECIFICATION forming part of Letters Patent No. 248,521, dated October 18, 1881.

Application filed August 2, 1881. (No model.) Patented in England December 24, 1878.

*To all whom it may concern:*

Be it known that I, PETER SPENCE, of Manchester, in the county of Lancaster, Great Britain, manufacturing chemist, have invented certain Improvements in Furnaces for Roasting Copper and other Ores, of which the following is a specification, reference being had to the accompanying drawings.

This invention relates to that class of furnaces for roasting ores in which a series of beds are arranged one above the other, and communicate through alternating passages or openings at the ends of the beds, a traveling or reciprocating rake being arranged to propel and agitate the ore on each bed and to successively discharge it from one to the other.

The object of my invention is to improve the means employed for feeding the ore to the furnace and for stirring or agitating and propelling the ore along the several beds. This object I accomplish by the construction and arrangement of parts embodied in the roasting-furnace illustrated in the accompanying drawings, in which—

Figure 1 shows an exterior side view of the furnace; Fig. 2, a plan view thereof; and Fig. 3, a cross-section of one half of a double furnace, the other half being shown in outside view; but as the two halves of this double furnace are mere repetitions of each other, it will only be necessary to describe the operations of one of them. Fig. 4 shows a longitudinal section of the furnace-beds, and Figs. 5, 6, and 7 detached views of the stirring and raking instruments.

I will in the first place describe the construction of the furnace-beds, and this will be explained by reference to Fig. 3. At 1 are the walls of the furnace, in which are fixed projecting fire-clay slabs 2. Upon these are placed tiles 3, reaching from one side transversely to the other, and each of convenient length, when put together longitudinally, to make the whole length of the several furnace-beds one above another, so that each of the said beds is made up by one tile only transversely.

Referring now to Figs. 3, 4, the several beds are shown at 3 $3^a$ $3^b$ $3^c$; but each one is not continued unbroken to the end walls of the furnace, there being alternate openings left at 4 5 6 7, and for the present, taking the operation generally, the material, in its ground state, is delivered at H onto the floor 3, and advancing rakes or plows stir it and subsequently, as I shall hereinafter describe, carry forward a portion of the said material and deliver it through the opening 4 onto the second bed, $3^a$.

The teeth of the rakes are formed of a triangular section, as shown in the enlarged detached view, Fig. 7, the apex of the triangle being in the direction of the motion of such rake longitudinally from end to end of the furnace, the flat sides of the teeth of the rake being in the direction in which it is desired to traverse the ore along the bed of the furnace. When the rake is advancing in the direction of the pointed part of the teeth of the rake the ore will be raked or turned over only; but when the rakes are being traversed in an opposite direction to that previously described a certain quantity of the ore will be carried by the flat side of the teeth of the rake along the floor of the furnace.

The ground material being delivered to the floor 3 at a point, H, the advancing rakes or plows, by means of the angular side of their teeth, stir it, and subsequently, by the flat sides of the said teeth, carry forward a portion of the said material and deliver it through the opening 4 onto the second bed, $3^a$, where the same operations take place, the material now passing down the opening 5 onto the bed $3^b$, and so through any number of a required series of beds, until it is at last discharged through the opening 7 into the receptacle 8. There is, however, this remark to be made, that, as the alternate openings in the successive beds are on alternate ends of the furnace, the stirring and conveying instruments must be reversed as regards their faces in succeeding beds, whereby the whole series, by traveling in one direction alternately on each bed, stir and deliver the material successively until it reaches the receptacle 8.

The teeth of the rakes are mounted in angle-iron bars 11, provided with rollers $11^\times$, which run upon rails 12, carried by the projecting supports 2. To each of these angle-bars are connected rods 13, attached at their other ends to a frame or carriage, 14, provided with wheels 15, which run upon rails 16 on the floor, the said rods being supported and guided by grooved pulleys 17.

To the carriage 14 are fixed toothed racks 18, situate outside the furnace, and supported at their outward ends by rollers 19, and in gear with these racks are pinions 20 on a shaft, 21, driven by the motive power. Motion being communicated to the shaft 21, the pinions 20 cause the racks 18 to traverse the frame 14, which, as stated, travels on the rails 16, and thus the rods 13 are caused to traverse the rakes or conveyers along the several beds of the furnace. According to the positions shown in the drawings, the carriage 14 is in its outward, or nearly outward, position, and the flat ends of the instruments will have delivered a certain amount of material through the opening 4 onto the bed $3^a$, the same operation having taken place with regard to the opening 6 and bed $3^c$. The carriage now running inward, the sharp points of the plows will simply stir the material on the beds 3 $3^b$, while the blunt ends on the floors $3^a$ will deliver an amount of material through the opening 5 onto the bed $3^b$, and at the same time the instruments on the floor $3^c$ will pass an amount of completely calcined material into the receptacle 8, to be removed at pleasure, and thus the alternate stirrings and deliveries take place at each forward and backward movement of the carriage.

I have not hitherto referred to the feeding of the ground material; but I now proceed to describe the means invented by me for accomplishing this purpose.

At F is a channel leading to the top floor, 3, and above this channel is a hopper, 20, into which the ground material is from time to time fed. The bottom of this hopper is provided with a sliding plate, 26, formed at its inward end with a ledge, as seen in Fig. 4. This plate is connected to rods 22, swung upon arms 23, and each having two stops, 24 25. According to the position shown, the material rests upon the ledge of the plate 26, which, when the carriage runs in, is pushed forward by its arrival in contact with the stops 24, and this action delivers a certain amount of material through the channel F. On the return motion of the carriage it arrives in contact with the stops 25 to shift the plate 26 back, and so on for each traverse.

Instead of the plate 26, there may be a winged bottom to the hopper or similarly-formed part. The drawings show a double furnace, which is the arrangement I prefer, and the operating parts of each are the same; but it may be single.

The shaft 21 is connected by means of suitable gearing to any source of motive power, so that it may be rotated first in one direction and then in the other, and thereby traverse the rakes alternately from one end of the furnace to the other.

The rakes may move continuously; but I prefer them to remain stationary periodically in the position shown in the drawings, as they are then clear of the material in the furnace, and also out of the direct action of the heat of the furnace, thereby suffering less injury from corrosion.

The furnace as above described does not require the application of any external heat. On starting it is brought to the required temperature by the introduction of burning wood or other suitable fuel, after which the temperature is self sustained by the combustion of the material under operation. By the use of the furnace as above described the whole, or nearly the whole, of the copper in cupreous pyrites or other sulphides is converted into soluble sulphate of copper, which may be placed in suitable vessels and subjected to the action of water for obtaining sulphate of copper in solution, which may be precipitated, as usual, or manufactured into pure sulphate of copper by removing the sulphate of iron which always accompanies it.

Having thus described the nature of my invention and the manner of carrying the same into effect, I desire it to be understood that I claim—

1. The combination, with a roasting-furnace having a series of beds communicating through alternating end openings, and with a series of reciprocating rakes, the parallel rods 13 and carriage 14, provided with the wheels 15, of the hopper 20, sliding plate 26, rod 22, and stops 24, arranged on said rod and adapted to be struck by the carriage in its movements, substantially as and for the purpose described.

2. The shaft 21, provided with end pinions, and the toothed racks 18, traveling on guides outside of the furnace, in combination with the carriage 14, connected with the racks, the rods 13, and the rakes arranged in the series of chambers in the furnace, substantially as described, for the purpose set forth.

PETER SPENCE.

Witnesses:
JOHN GILCHRIST,
   *Booth St., Holland St., Manchester.*
WILLIAM THOMAS CHEETHAM,
   *18 St. Ann's St., Manchester.*